Sept. 20, 1960
W. C. HASSELHORN
2,953,625
CABLE TERMINAL BOX ASSEMBLY
Filed Jan. 26, 1954
2 Sheets-Sheet 1
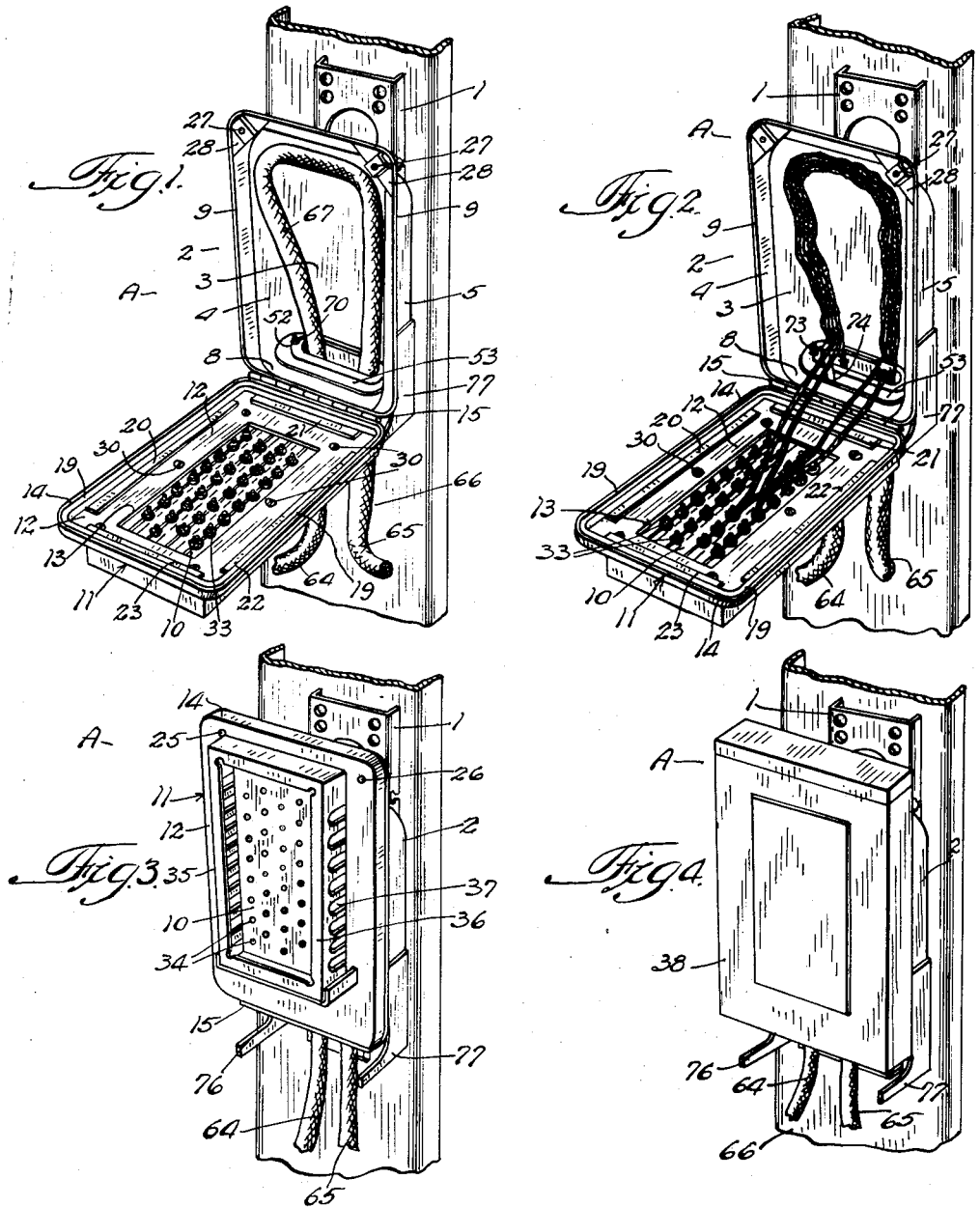
INVENTOR.
Walter C. Hasselhorn
BY Sept. 20, 1960    W. C. HASSELHORN    2,953,625
CABLE TERMINAL BOX ASSEMBLY
Filed Jan. 26, 1954    2 Sheets-Sheet 2

INVENTOR.
Walter C. Hasselhorn.
BY
Thiess, Olsen, Mecklenburger, von Holst & Coltman.

United States Patent Office 2,953,625
Patented Sept. 20, 1960

2,953,625

CABLE TERMINAL BOX ASSEMBLY

Walter C. Hasselhorn, Evanston, Ill., assignor, by mesne assignments, to Cook Electric Company, Chicago, Ill., a corporation of Delaware Filed Jan. 26, 1954, Ser. No. 406,111

7 Claims. (Cl. 174—60)

This invention relates to cable terminals and more particularly to terminal boxes for electric cables adapted to be mounted on telephone poles and other like supports, carrying telephone line cables, to provide for ready connection to the drop wires leading to subscribers' instruments.

Terminals of this character are usually mounted on poles where it is difficult to work if the parts are not readily accessible. Usually, it is desirable to protect the cable against the entrance of moisture by providing a moisture-tight chamber or compartment into which the cable may be extended and its wires distributed to the terminal posts of subscribers' lines. However, it is preferable that these terminal posts are readily accessible in order to permit making the necessary changes in and additions to the wiring connections that must be made at different times to correspond to changes in and additions to the customers' lines. These terminal posts generally consist of members passing through the front plate with terminal facilities at each end. As heretofore provided, the arrangement required potting of the cable where it enters the terminal housing to prevent moisture entering the cable and the chamber or compartment where the cable wires are spliced. In many cases, stubbing of the cable at the terminal housing was necessary which added to the lineman's work and the amount of soldering to be done, sometimes in a position difficult to perform such work satisfactorily.

An object of the invention is to provide a terminal box of improved construction having, as one of its features, an improved form of entrance for the cable whereby stubbing, splicing of the wires and potting of the cable are eliminated. This construction greatly reduces the amount of work required by a lineman on the pole both in the initial installation and in the servicing of the terminal box after installation.

Another important feature of the invention resides in the construction of the aforesaid cable entrance in the terminal box. The cable entrance disclosed herein is provided in the form of an opening in the housing that has a grommet or gasket adapted to be clamped over the opening to provide a moisture-tight seal between the housing and the grommet or gasket. The grommet is apertured preferably at two places and the wall of the grommet adjacent to the apertures is slitted to receive the legs of a loop in the cable. The cable loop is projected into and through the opening in the housing and caused to extend or lie in the cable chamber or compartment. A novel form of clamp lies over the grommet or gasket and it is tightly clamped to the housing wall to compress the grommet or gasket tightly about the two cable legs and to secure an effective moisture-proof seal both between the cable legs and the grommet and the terminal housing.

A still further object of the invention resides in the manner of making connections between the cable wires and the set of terminal posts arranged to receive these wires. Splicing of the cable wires is not necessary. The sheath of the cable is preferably cut or peeled back to make the cable wires accessible and the bare wires may then be exposed for a short distance, say, at the time they are to be connected to the set of terminal posts extending into the cable chamber.

A still further object of the invention resides in the unique arrangement and construction of parts comprising the cable terminal including the mounting of the terminal face plate and its frame member whereby the same may be readily accessible when the cover is removed to make the necessary changes in the customers' drop wires and further may be readily swung about a pivotal mounting to give ready and convenient access to the terminal posts within the cable chamber as well as the cable wires to make changes in their connections to these customers' drop wires. This ready access is provided without in any way sacrificing the sealed relation that must be maintained when the face plate is in closed position in order to maintain a moisture-tight cable chamber.

A still further object of the invention is the simple and compact arrangement of the parts resulting from the improvements herein disclosed.

Other objects and advantages of the invention will be apparent from the following detail description when taken in connection with the accompanying drawings in which:

Figure 1 is a perspective view of a pole cable terminal box mounted in position on a pole or the like and showing the terminal face plate and its frame swung open and the cable looped through the grommet or gasket in the base of the housing.

Fig. 2 is a similar view illustrating the sheath of the looped cable removed and certain of the cable pairs terminating at the face plate studs.

Fig. 3 is a similar view illustrating the hinged terminal face plate closed in sealed-tight relation and the customers' service or drop wires (not shown) ready to be connected and led through the openings of the fanning strips formed at the side walls of the terminal face plate.

Fig. 4 is also a similar view illustrating the cover in position.

Figure 5:
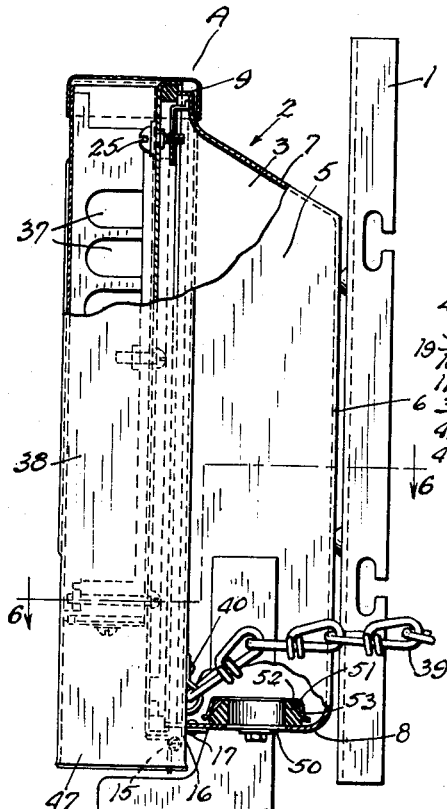
Fig. 5 is a view partly in side elevation and partly in vertical cross section of the unit as shown in Fig. 4 with the cover mounted in place.
Figure 6:
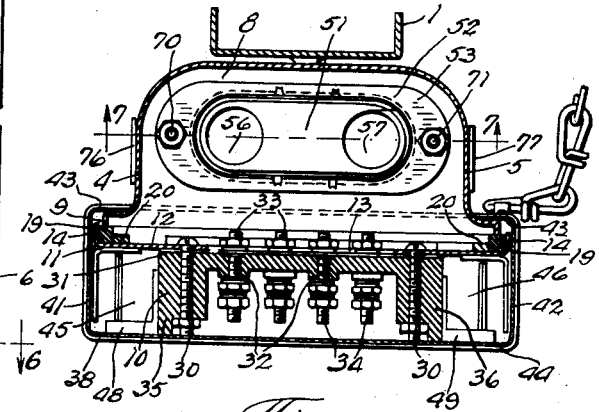
Fig. 6 is a transverse sectional view taken along line 6—6 of Fig. 5.

The pole cable terminal illustrated in the drawings is of a type particularly adapted to be mounted upon telephone poles or like supports as shown in Figs. 1 to 4, inclusive. Bracket 1 may be of any desirable construction arranged to be attached directly to the pole or other mounting. The pole cable terminal is designated broadly as "A," and, as shown in Fig. 5, it may comprise a housing 2 provided with a deep drawn chamber 3 having side walls 4 and 5, a rear wall 6 and upper and lower walls 7 annd 8. A forwardly extending flange 9 is formed peripherally about upper and lower walls 7 and 8 and side walls 4 and 5. Housing 2 may be attached to mounting bracket 1 in any of the many well known ways to permit mounting bracket 1 to be then attached to a telephone pole or other support.

Figure 7:
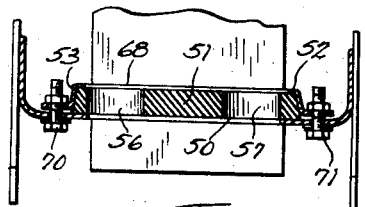
Fig. 7 is a transverse sectional view taken along line 7—7 of Fig. 6.
Figure 8:
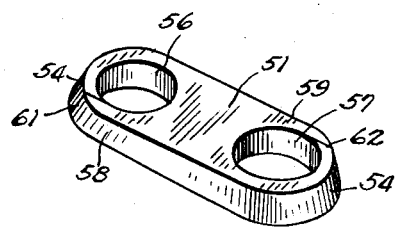
Fig. 8 is a detail view of the grommet or gasket illustrating the split side walls adjacent to apertures adapted to receive the legs of the cable entering the housing in the form of a loop.

A terminal face plate 10, preferably molded of insulating material, is secured to a steel frame 11 in the form of a plate 12 provided with a relatively large center opening 13 and a rearwardly turned peripheral flange 14, this steel frame 11 being hinged at 15 to a bracket 16 secured at 17 to lower wall 5. A gasket 19, rectangular in formation, preferably fits in with frame 11 against peripheral flange 14, this gasket 19 being held in position tightly against peripheral flange 14 by strips 20, 21, 22 and 23 secured to the inside face of plate 12 in any desirable manner. In this connection, it will be observed that the outer face of gasket 19 will be brought tightly against the outer edge face of flange 9 of housing 2 when the hinged frame 11 is swung to closed position as shown in Figs. 3, 5 and 7. To keep frame 11 tightly locked in closed position and gasket 19 effecting a moisture-tight seal for chamber 3, a simple connection in the form of two screws 25 and 26 (Fig. 3) may be employed, these screws 25 and 26 threading through plate 12 to engage in openings 27 in cross braces 28 provided in the two upper corners of housing 2. Terminal face plate 10 is secured to plate 12 over its central opening 13 by a plurality of bolts 30. Bolts 30 tightly hold terminal face plate 10 against plate 12. A gasket 31 is interposed between the two parts to assure a moisture-tight seal at the connection and thus to prevent any moisture entering cable chamber 3. While the particular design of face plate 10 is desirable in the pole cable terminal disclosed herein, it will be understood that variations or changes may be used. A series of terminal posts 32 is anchored in face plate 10 so that terminal connections 33 are exposed to the interior of cable compartment 3 and terminal connections 34 are accessible exteriorly of the unit after plate 12 is swung to closed position to receive drop wires (not shown) leading from the subscribers' service. Side walls 35 and 36 together with their openings 37 constitute in effect fanning strips for these customers' drop wires to provide, as is understood in this art, a proper distribution of the customers' drop wires usually arranged in pairs and connecting to the terminal posts 32 at their exterior connections 34.

A cover 38 is provided to enclose terminal plate 10 to protect the customers' or subscribers' drop wires and this face plate 10 from the elements. A chain 39 may be attached at 40 to cover 38 so that the lineman will not inadvertently drop the cover from his position on the pole at the time of servicing the unit. Cover 38 is preferably in the form of a hood adapted slidably to fit in position, its side walls 41 and 42 having their vertical back edges turned into short flanges 43 that will engage against the return face of the portion of housing 2 extending forwardly to provide the flanges 9. Front face 44 of cover 38 is guided by a pair of brackets 48 and 49 secured to the side of terminal face 10. The arrangement provides passages 45 and 46 for the customers' drop wires extending upwardly through the open bottom end 47 of cover 38.

An elongated opening 50 is provided in bottom wall 5 of housing 2 (see Figs. 5 and 7). A grommet or gasket 51 is arranged to be set over opening 50 and held tightly in position by a clamping member 52 having a downwardly extending skirt 53 about its sides to engage the side walls 54 of grommet 51. Grommet 51 is preferably apertured at 56 and 57 and the portion of the side walls 54 adjacent these apertures, designated for reference purposes as 58 and 59, are slitted as indicated at 61 and 62. Inasmuch as it is desirable for the material of grommet 51 to be flexible and compressible, these wall portions 58 and 59 may be turned back or flexed outwardly to open the apertures 56 and 57 at slits 61 and 62 whereby to receive the legs 64 and 65 of cable 66 leading to the pole cable terminal. This cable 66 is preferably looped at 67 and the loop is passed through opening 50 in bottom wall 5. Thereafter, the apertures 56 and 57 may be opened at their slits 61 and 62 and these cable legs 64 and 65 inserted. Thereafter, the clamping member 52 which is also apertured centrally at 68 is slid downwardly over cable loop 67 and firmly pressed against grommet 51, bolts 70 and 71, clamping its skirt 53 against the grommet's tapered side walls to compress or squeeze the grommet against the face of bottom wall 5 of housing 2 and about cable legs 64 and 65 to form a moisture-tight seal at this point between cable chamber 3 and the cable legs 64 and 65.

Fig. 1 illustrates the cable loop 67 lying within cable chamber 3 after clamping member 52 has been brought into position by its screws 70 and 71 to effect this seal. Fig. 2 illustrates the removal of the sheath from the cable at this loop 67 so that the cable conductors may be connected to the proper terminal connectors 33 of terminal posts 32. It will be observed that insulation about these cable conductors may be removed only at the point of connection to the terminal posts which greatly adds to the ease of the lineman on the pole making changes in or rearranging the incoming service lines to the customers' drop lines.

As illustrated in Figs. 1 to 3, inclusive, the frame 11, including plate 12 and terminal face plate 10, forms in effect a swinging door hinged at 15 which can be readily opened as shown in Figs. 1 and 2 by the removal of screws 25 and 26 after cover 38 has been removed. This will provide ready and convenient access to these cable wires and terminal connections 33. A pair of bracket members 76 and 77 is secured to the sides of housing 2 to provide rest arms at their forward ends for frame 11 to rest upon, as shown in Figs. 1 and 2, while the lineman is making the necessary changes in the circuit connection. In order to ground any static accumulation that may build up in cable 66, the end of metallic ribbon 73 usually employed as a wrapping about the cable conductors inside of the outer lead sheathing may be soldered at 74 to housing 2.

In the foregoing description, it is apparent that the present invention eliminates the difficulties heretofore encountered in stubbing a cable at a pole cable terminal box and the difficulties encountered in potting the cable leading into the cable chamber of a pole terminal box. Also, the labor involved in splicing is likewise eliminated. The hazardous position of a lineman on a pole makes stubbing, potting and splicing difficult and tedious. The elimination of these difficulties also increases the ease with which a lineman may make changes in the connections between the cable conductors and the customers' drop wires. Hinging frame 11 in the manner disclosed herein, which includes carrying the terminal face plate thereon, allows ready access to the conductor chamber 3 and permits a unique form of moisture-proof seal when the frame is swung about its hinge to closed position. The cable terminal box embodying the present invention greatly simplifies the work of a lineman in making an intial insallation and thereafter servicing the same from time to time and renders his work less hazardous while on a pole.

Without further elaboration, the foregoing will so fully explain the character of my invention that others may, by applying current knowledge, readily adapt the same for use under varying conditions of service, without eliminating certain features, which may properly be said to consitute the essential items of novelty involved, which items are intended to be defined and secured to me by the following claims.

I claim:

1. A terminal box assembly comprising: a housing having a terminal access opening and a single cable-entrance opening, the latter opening having dimensions to permit a loop of cable to be inserted into said cable opening only in a predetermined orientation with respect to the walls of said housing; a loop of multi-conductor cable disposed within said housing, said loop having adjacent legs passing through said cable opening; means removably coupling the legs of said loop to said housing; a cover pivotally mounted on said housing for closing said access opening; and terminals disposed on said cover connected directly to unsevered conductors of said loop.

2. A terminal box assembly comprising: a housing having a terminal access opening and a single cable-entrance opening; a loop of multi-conductor cable disposed in said housing, said loop having adjacent legs fitted in said cable opening such that the legs of said loop at said cable opening form an angle with the plane containing said cable opening; means removably coupling the legs of said loop to said housing, the said coupling means including removable means for sealing said cable opening; a cover pivotally mounted on said housing adjacent said cable opening for closing said access opening; and terminals disposed on said cover connected directly to unsevered conductors of said loop.

3. A terminal box assembly comprising: a housing including a first wall with a terminal access opening and a second wall with a single cable-entrance opening having dimensions permitting a cable loop to be inserted into said cable entrance opening at an angle to the plane containing said opening, whereby said loop will be disposed in a predetermined orientation within said housing; a loop of multi-conductor cable disposed in said housing, said loop having legs passing through said cable opening; a pliable gasket having two apertures and a slit from each aperture to the exterior of the gasket whereby the legs of said loop can be inserted in said apertures by opening the said slits; means removably mounting said gasket in sealing relation to said legs in said apertures and to said second wall at said cable opening; a cover for closing said access opening pivotally mounted on said housing adjacent said cable opening; a plurality of inner terminals on the inside of said cover connected directly to unsevered conductors of said loop; a plurality of outer terminals on the other side of said cover; and means electrically connecting each inner terminal to a separate one of said outer terminals.

4. A terminal box assembly comprising: a housing having a terminal access opening and a single cable-entrance opening, the latter opening having dimensions to permit the loop to be inserted into said cable opening only in a predetermined orientation with respect to the walls of said housing; a loop of multi-conductor cable disposed in said housing, said loop having a U-bend and adjacent legs passing through said cable opening; means removably coupling the legs of said loop to said housing, the said coupling means including removable means for sealing said cable opening; a cover for closing said access opening pivotally mounted on said housing adjacent said cable opening; a plurality of inner terminals on the inside of said cover connected directly to unsevered conductors of said loop; a plurality of outer terminals on the other side of said cover; means electrically connecting each inner terminal to a separate one of said outer terminals; and means limiting the pivotal movement of said cover when open to a position facilitating connection and disconnection of said unsevered conductors to and from said inner terminals.

5. A terminal box assembly comprising: a housing having a first wall with a terminal access opening and a second wall with a single cable-entrance opening having dimensions to permit a cable loop to be inserted into said housing only in a predetermined orientation angularly related to the plane containing said opening; a loop of multi-conductor cable disposed in said housing, said loop having an unsheathed bend and having legs sheathed at a predetermined distance from said bend passing through said cable opening; a pliable gasket having two apertures and a slit from each aperture to the exterior of the gasket whereby the sheathed portion of said legs can be inserted in said apertures by opening said slits; means removably mounting said gasket in sealing relation to the said legs and to said second wall at said cable opening; a cover for closing said access opening pivotally mounted on said housing adjacent said cable opening; a plurality of inner terminals on the inside of said cover connected directly to unsevered conductors of said loop; a plurality of outer terminals on the other side of said cover; and means limiting the pivotal movement of said cover when open to a position facilitating connection and disconnection of said unsevered conductors to and from said inner terminals.

6. A terminal box assembly comprising: a housing having a terminal access opening and a single cable entrance opening, the latter opening having dimensions to permit a loop of cable to be inserted into said cable opening only in a predetermined orientation with respect to the walls of said housing; a loop of multi-conductor cable disposed within said housing, said loop having adjacent legs passing through said cable opening; means removably coupling the legs of said loop to said housing; a cover for closing said access opening; means for disengageably securing said cover to said housing; and terminals disposed on said cover connected directly to unsevered conductors of said loop.

7. A terminal box assembly comprising: a housing having a terminal access opening and a single cable entrance opening; the latter opening having dimensions to permit a loop of cable to be inserted into said cable opening only in a predetermined orientation with respect to the walls of said housing; a loop of multi-conductor cable disposed within said housing, said loop having adjacent legs passing through said cable entrance opening; a pliable gasket having two apertures and a slit from each aperture to the exterior of the gasket whereby the legs of said loop can be inserted into said apertures by opening said slits; means removably mounting said gasket in sealing relation to said legs with said legs in said apertures and to said housing at said cable entrance opening; a cover for closing said access opening; means for disengageably securing said cover to said housing; and terminals disposed on said cover and connected directly to unsevered conductors of said loop.

References Cited in the file of this patent

UNITED STATES PATENTS

| | | |
|---|---|---|
| 256,866 | Teal | Apr. 25, 1882 |
| 477,218 | McLeod | June 21, 1892 |
| 547,078 | Johnson | Oct. 1, 1895 |
| 900,382 | Joynes | Oct. 6, 1908 |
| 965,684 | Bierce et al. | July 26, 1910 |
| 1,223,750 | Wakefield | Apr. 24, 1917 |
| 1,620,047 | Van Valkenburg | Mar. 8, 1927 |
| 1,845,639 | Wermine | Feb. 16, 1932 |
| 1,862,811 | Strong | June 14, 1932 |
| 1,952,695 | Webb | Mar. 27, 1934 |
| 2,021,594 | Emmons | Nov. 19, 1935 |
| 2,185,562 | Nielsen | Jan. 2, 1940 |
| 2,517,717 | Rose | Aug. 8, 1950 |
| 2,683,304 | Channell | July 13, 1954 |
| 2,771,502 | King et al. | Nov. 20, 1956 |

OTHER REFERENCES

Donovan et al.: The Post Office Electrical Engineering Journal, vol. 46, January 1954, pages 183–186.